United States Patent Office 2,870,114
Patented Jan. 20, 1959

2,870,114

SOLID ISOCYANATE MODIFIED POLYETHYLENE ADIPATE DISPERSED IN LIQUID ISOCYANATE MODIFIED POLYETHYLENE ADIPATE

Ronald Horace Shrimpton, Perry Barr, and Harry Graham Mitchell, Harborne, Birmingham, England, assignors to Dunlop Rubber Company Limited, London, England, a British company No Drawing. Application February 21, 1955
Serial No. 489,744

Claims priority, application Great Britain
February 27, 1954

5 Claims. (Cl. 260—45.4)

This invention relates to polymers modified with isocyanates or isothiocyanates and to a method of preparing synthetic elastomers therefrom.

In the preparation of synthetic elastomers from polyisocyanate modified polyesters difficulty is experienced because of the high chemical reactivity of the isocyanates. The reaction is difficult to control and the products obtained are extremely difficult to process, since usually they can only be milled, extruded or shaped by moulding for an exceedingly short time after their formation. A process of this type possesses very serious limitations from a production point of view.

The reaction products can be obtained in the form of a solid crumb but sheets or strips prepared from this material are normally so tough that they cannot be satisfactorily calendered or extruded and, moreover, the material requires very high moulding pressures.

Our invention provides compositions based on reaction products of the above type which possess a plasticity which enables them to be shaped without difficulty.

Further, our invention provides an improved method of preparing synthetic elastomers from the said compositions. Such a method has the advantage that it can utilize material which has been stored for relatively long periods.

According to our invention a composition for the production of synthetic elastomers from reaction products of polymers with organic polyisocyanates or polyisothiocyanates comprises a plastic suspension of particles of a reaction product of the said kind in the solid state dispersed in a reaction product of the said kind in the liquid state.

According to the invention also, a method of preparing synthetic elastomeric products comprises shaping a plastic composition of the kind defined in the last preceding paragraph and converting the composition to an elastomer.

The reaction products and elastomeric products of this invention are well known. The polymers from which they are obtained may be polyethers, polyesters, polyesteramides or polyamides obtained by condensation of polybasic carboxylic acids with polyhydric alcohols, amino-alcohols and/or diamines; these polymers are then reacted with organic polyisocyanates or polyisothiocyanates, for example organic diisocyanates. The reaction product is then further reacted, if so desired, with polyfunctional compounds such as water, polyhydric alcohols, and amino-alcohols which act as cross-linking agents. The reaction products so obtained are frequently termed isocyanate-modified polymers.

The preferred compositions are those prepared from reaction products of linear polyesters with naphthalene di-isocyanates and these may be combined with cross-linking agents, such as water or a glycol, if desired. An example of a suitable reaction product is that obtained essentially from polyethylene glycol adipate and naphthalene-1:5-diisocyanate.

In carrying out the invention, a reaction product of the type described is prepared in solid crumb form in accordance with the known procedure and, if necessary the crumb is reduced in size with a mechanical disintegrator. The particle size may be of the order of 20 mesh (British Standard sieve) or smaller. The powdered crumb so produced can be stored for some time without affecting its subsequent usefulness in the invention.

When it is desired to convert the powdered crumb into moulded elastomeric materials the powder is mixed with a suitable proportion of reaction product which is still in the liquid form to give a paste or fluid which can be shaped as desired. The liquid reaction product may be prepared from the same polyester and isocyanate as the crumb material or, if desired, other polymers and isocyanates can be used. The proportion of liquid product used can be varied according to the type of product required but is usually between 10 percent and 150 percent of the weight of the crumb proportions which have been found to be particularly convenient are those lying in the range of 80 to 120%.

The viscosity of the liquid component used may vary considerably and highly viscous reaction products can be used provided that, when the desired amount of crumb is incorporated in the liquid, a paste is obtained which can be shaped by moderate pressure. In general, no cross-linking agent will be used during the preparation of the liquid reaction product. If such agents are present, however, suitable polymerisation inhibitors must also be employed so that the reaction product retains sufficient fluidity during its processing life.

The resulting paste or dough can be shaped by a simple pressing operation to any desired shape, e. g. a tyre tread section. Such pressings have sufficient adhesion and strength to enable them to be used in tyre building operations and the resulting shaped articles can then be moulded under pressure.

Whilst normal moulding pressures may be used, e. g. 250 lb./sq. in. in some cases it may be preferable to use somewhat higher moulding pressures, e. g. up to 1,000 lb./sq. in.

Alternatively, if the paste is prepared with a suitable consistency it can be used for injection moulding processes.

Although the paste hardens on storage, it has a working life which is sufficient to enable it to be used for shaping processes which would be either impossible or very difficult to operate with the liquid or solid reaction products used hitherto.

The invention is illustrated by the following examples in which all parts are given by weight:

EXAMPLE 1

*Preparation of the crumb*

100 parts of polyethylene adipate of molecular weight about 2,000 available commercially under the name Desmophen 2,000 and 18 parts of naphthalene 1:5 diisocyanate available commercially under the name Desmodur 15 were reacted together in an internal mixer for about 12 minutes at 125° C. to produce a syrup. (These times and temperatures will vary according to circumstances and are governed by the exothermic nature of the reaction.)

0.8 part of water was then added and after a further 15 minutes mixing the product became a coarse dry crumb. This crumb was passed through a mechanical disintegrator until at least 90% of the final crumb was passed through a 30 mesh (per inch) sieve.

Preparation of the syrup

The syrup was prepared from 100 parts of Desmophen 2,000 and 18 parts of Desmodur 15 in exactly the same manner as for the start of the crumb process described above but no water was added.

Preparation of the moulding composition 0.8 part of water was intimately mixed with every 100 parts of crumb. (This water is for the subsequent cross-linking of the syrup phase of the composition and the quantity required varies with the crumb/syrup ratio used.)

100 parts of the damp crumb and 100 parts of the fresh syrup were mixed together in an internal mixer for about 15 minutes at about 90° C. The resulting dough-like mass was pre-formed to a desired shape for about 5 minutes at about 100° C. under low pressure. The resulting pre-formed shape was transferred to a mould and cured.

The moulding conditions were as follows:

Pressure _____ 500 lbs./sq. in.
Time and temperature _____ 45 mins. at 150° C.

In order to obtain optimum properties the moulding was subsequently stoved in hot air for 24 hours at 110° C. or 72 hours at 70° C.

Properties of the moulding

Typical test results of mouldings made by the above process are as follows:

Tensile strength (lbs./sq. in.) _____ 5,000
Elongation at break (percent) _____ 670
Tear strength (lbs./in. at 20° C.) _____ 780

EXAMPLE 2

Preparation of the crumb 100 parts of Desmophen 2,000 and 18 parts of Desmodur 15 were reacted together in an internal mixer for about 12 minutes at 125° C. to produce a syrup as described in Example 1.

2 parts of butane 1:4 diol were then incorporated into the syrup which was cast into trays and heated for 24 hours at 110° C. The slabs of crumb material so obtained were then reduced to fine crumb form in a mechanical disintegrator until at least 90% of the final crumb passed through a 30 mesh (per inch) sieve.

Preparation of the syrup

The syrup was prepared from 100 parts of Desmophen 2,000 and 18 parts of Desmodur 15 in exactly the same manner as for the start of the crumb process described above but no butane 1:4 diol was added.

Preparation of the moulding composition 1.0 part of butane 1:4 diol was intimately mixed with 100 parts of crumb. (The butane 1:4 diol is for the subsequent cross-linking of the syrup phase of the composition and the quantity required varies with the crumb/syrup ratio used.) 100 parts of the fresh syrup were mixed with the treated crumb in an internal mixer, the resulting dough-like mass was pre-formed to a desired shape and the resulting pre-formed shape was transferred to a mould and cured exactly as described in Example 1.

Properties of the moulding

Typical test results of mouldings made by the above process are as follows:

Tensile strength (lbs./sq. in.) _____ 3710
Elongation at break (percent) _____ 565
Resilience (percent) _____ 73
Hardness (B. S. degrees) _____ 77

EXAMPLE 3

Preparation of the crumb

The crumb was prepared as described in Example 2 with the exception that the 2 parts of butane 1:4 diol were replaced by an equal quantity of butene 1:4 diol.

Preparation of the syrup

As described in Example 2.

Preparation of the moulding composition

As described in Example 2 with the exception that the 1.0 part of butane 1:4 diol was replaced by an equal quantity of butene 1:4 diol.

Properties of the moulding

Typical test results of mouldings made by the above process are as follows:

Tensile strength (lbs./sq. in.) _____ 3495
Elongation at break (percent) _____ 635
Resilience (percent) _____ 70
Hardness (B. S. degrees) _____ 76

The resilience figures quoted in Examples 2 and 3 were measured using a Dunlop Tripsometer.

Having now described our invention, what we claim is:

1. A composition for the production of rubbery solids which comprises particles of a solid reaction product of polyethylene adipate and naphthalene diisocyanate cross-linked by a member of the group consisting of water and a glycol to form a finely divided solid, said solid being dispersed in a liquid reaction product of polyethylene adipate with naphthalene diisocyanate in an amount equal to between 10% and 150% by weight of the solid crumb and a cross-linking agent of the group consisting of water and a glycol for said polyethylene adipate and said naphthalene diisocyanate.

2. The composition of claim 1 in which said cross-linking agent is water.

3. The composition of claim 1 in which said cross-linking agent is butane 1:4 diol.

4. The composition of claim 1 in which said cross-linking agent is butene 1:4 diol.

5. The composition of claim 1 in which said polyethylene adipate is present in proportion of 100 parts by weight to 18 parts by weight of naphthalene 1:5 diisocyanate.

References Cited in the file of this patent

FOREIGN PATENTS 898,682    Germany _____ Dec. 3, 1953